Jan. 11, 1955

C. H. ELLISON ET AL 2,699,318

FLAP VALVE

Filed Feb. 28, 1952

INVENTORS
CLARENCE H. ELLISON
AND LUCAS H. MOE, JR.
BY Herman L Gordon
ATTORNEY

Jan. 11, 1955
C. H. ELLISON ET AL
2,699,318
FLAP VALVE
Filed Feb. 28, 1952
2 Sheets-Sheet 2
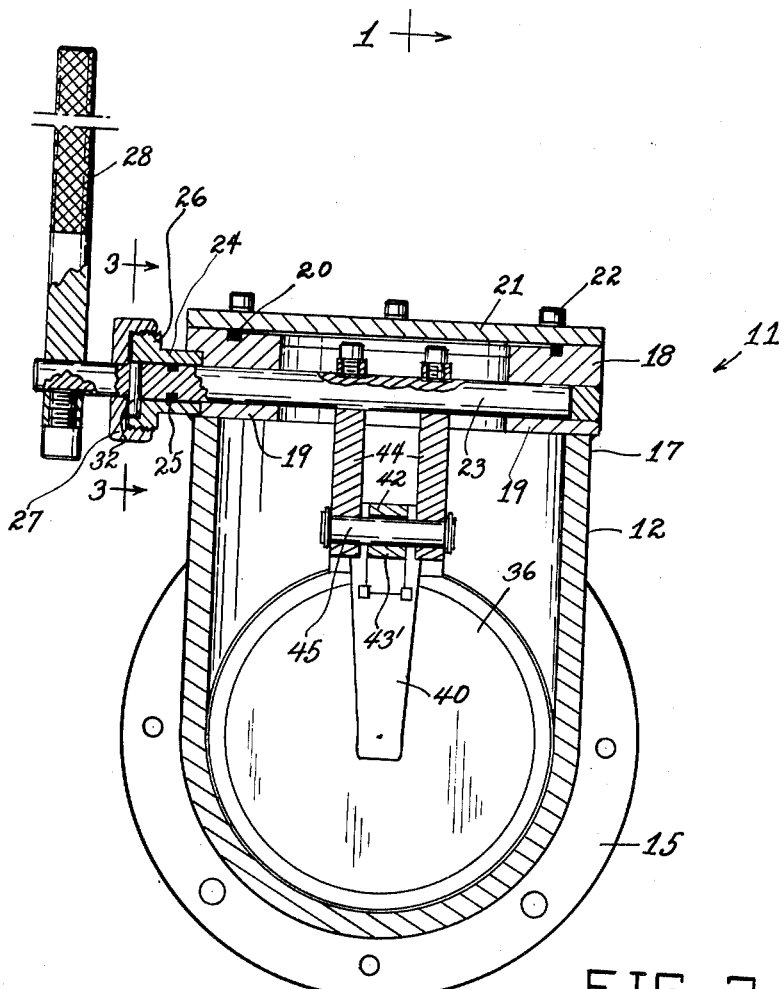
FIG. 2
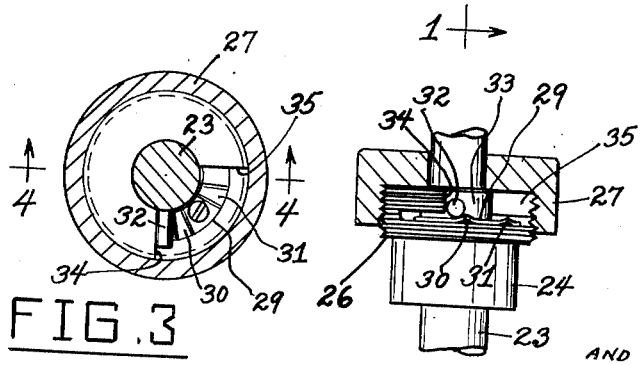
FIG. 3
FIG. 4
INVENTORS
CLARENCE H. ELLISON
AND LUCAS H. MOE, JR.
BY 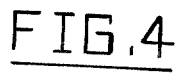
ATTORNEY

United States Patent Office 2,699,318
Patented Jan. 11, 1955

2,699,318

FLAP VALVE

Clarence H. Ellison and Lucas H. Moe, Jr., Silver Spring, Md., assignors to American Instrument Co., Inc., Silver Spring, Md.

Application February 28, 1952, Serial No. 273,836

3 Claims. (Cl. 251—158)

This invention relates to valves, and more particularly to flap valves.

A main object of the invention is to provide a novel and improved flap valve, said flap valve being simple in construction, being easy to operate, and providing a substantially positive liquid and gas-tight seal.

A further object of the invention is to provide an improved flap valve which is relatively inexpensive to fabricate, which is rugged in construction and can be quickly operated manually with relatively small manual force, and which is automatically lockable in either a closed or open position.

A still further object of the invention is to provide an improved flap valve which can be quickly operated manually and which is automatically lockable in either a closed or open position, said valve requiring a relatively small manual force to lock it in a closed or open position, yet being arranged to develop sufficient internal force on its valve face when closed so that it will not leak when excessive hydraulic or gaseous pressures are applied to the face in either direction.

A still further object of the invention is to provide an improved flap valve which is reliable in operation, which provides a tight seal, and which is extremely small in comparison with the large clear aperture it provides when open.

A still further object of the invention is to provide an improved flap valve especially suitable for high vacuum work, which is adapted to be mounted in a vacuum line and to be operated externally through a rotating seal, thus being considerably more efficient than hitherto known vacuum valves employing sliding seals, since, in general, sliding seals are not as satisfactory for vacuum work as rotating seals.

Further objects and advantages of the invention will become apparent from the following description and claims, and from the accompanying drawings, wherein:

Figure 2 is a transverse vertical cross-sectional view taken on line 2—2 of Figure 1.

Figure 3 is an enlarged cross-sectional detail view taken on the line 3—3 of Figure 2.

Figure 4 is a cross-sectional view taken on the line 4—4 of Figure 3.

Figure 1:
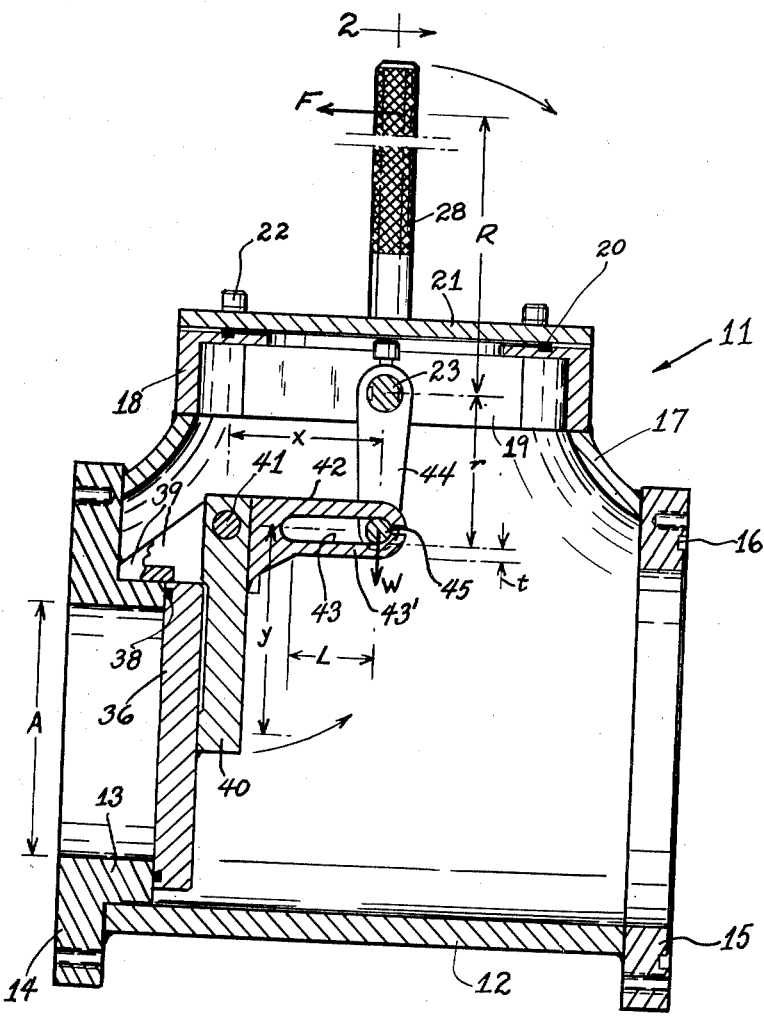
Figure 1 is a longitudinal vertical cross-sectional view of an improved flap valve constructed in accordance with the present invention, the valve being shown in closed position, said view being taken on the line 1—1 of Figure 2.

Referring to the drawings, 11 generally designates a flap valve according to the present invention. The valve 11 comprises a casing 12 formed at one end with an annular inwardly facing valve seat 13 having the annular coupling flange 14. The other end of casing 12 is formed with the annular coupling flange 15. The outer face of flange 15 is formed with the annular groove 16 adapted to receive a suitable resilient deformable gasket ring.

The casing 12 is formed with an upwardly tapering top section 17 on which is rigidly secured the ring member 18, said ring member having opposing thickened wall portions 19, 19. The top surface of the ring member 18 is annularly grooved to receive a sealing ring or gasket 20 of resilient deformable material. Designated at 21 is a cover disc which is clampingly secured on the top surface of the ring member 18, as by bolts 22.

Designated at 23 is a shaft member which is journalled in the thickened portions 19, 19 of the ring member 18 and extends externally of the ring member through a flanged bushing 24. The shaft 23 is annularly grooved in the bushing 24 and is provided thereat with the annular sealing ring 25 of deformable resilient material, defining a rotatable seal of shaft 23 with respect to the bushing. The flange of the bushing, shown at 26, is formed with external threads which are engaged by an internally threaded annular cap 27 rotatably mounted on shaft 23, as shown. Secured to the external end of shaft 23 is the operating handle 28.

The flange 26 is recessed within the cap 27, as shown at 33, and has secured therein the arcuate, flat, resilient detent spring 29 arranged in a plane normal to shaft 23 and concentric therewith. Said spring is formed with the spaced radial corrugations 30 and 31, as shown in Figures 3 and 4. Transversely secured in shaft 23 is a radial pin 32 which extends over the spring 29 and is arranged to be lockingly and yieldably held by the corrugations 30 and 31 against the respective radial end shoulders 34 and 35 of the recess 33. As shown in Figure 3, the radial stop shoulders 34 and 35 are spaced apart by substantially 90 degrees, so that the shaft 23 may be yieldably locked in either of two rotated end positions 90 degrees apart.

Designated at 36 is a valve disc which is arranged for valving cooperation with the rim of the valve seat 13. Said disc is formed at the peripheral portion of its valving face with an annular groove 37 of trapezoidal cross-section which contains a sealing ring or gasket 38 of resilient deformable material. Designated at 39, 39 are respective parallel, spaced triangular bracket members rigidly secured to the valve seat 13 above the disc 36, as viewed in Figure 1. Rigidly secured to the valve disc 36 is an arm 40 which extends between the bracket members 39, 39 and is pivotally connected thereto by a transverse pivot pin 41. Rigidly secured to arm 40 adjacent pin 41 and at right angles to the plane of valve disc 36 is an arm 42 which is formed with a longitudinal slot 43. Secured to shaft 23 are the parallel arms 44, 44 which extend on opposite sides of arm 42 and are connected by a transverse pin 45 which extends through the slot 43, as shown in Figure 1.

Figure 5:
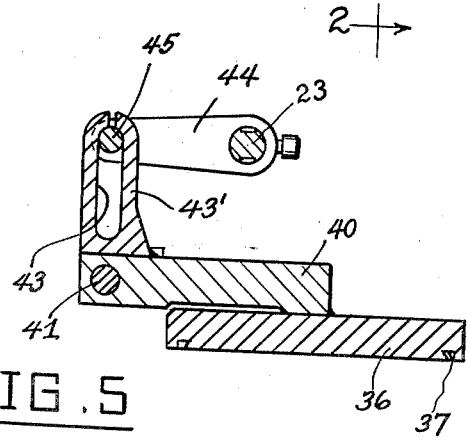
Figure 5 is a vertical cross-sectional detail view taken longitudinally through the operating linkage of the valve of Figures 1 and 2, showing the relative positions of the movable valve parts when the valve is in open position.

It will be apparent from Figure 1 that with the operating handle 28 locked in the vertical upstanding position shown, the valve disc 36 will be in sealing position against the rim of valve seat 13. By rotating the handle 28 clockwise, as viewed in Figure 1, through its 90 degree rotary stroke, the valve disc 36 will be moved to its fully opened position shown in Figure 5, by the camming cooperation of the pin 45 with the slot 43, since clockwise rotation of arms 44 causes arms 42 and 40, and the valve disc, to be rotated counterclockwise.

In order to assure a tight seal between valve disc 36 and the rim of valve seat 13, the lower beam portion 43' of arm 42 is placed in flexure downwardly around the pivot pin 41 for the final portion of the clockwise rotary stroke of arms 44 in closing the valve to the position thereof shown in Figure 1. The required force Q on the valve disc 36 is obtained by applying a force W to the lower member or beam 43' of the slot 43, where $$W = \frac{y}{x} Q \tag{1}$$

As shown in Figure 1, $y$ is the distance between the center of disc 36 and the axis of pin 41, and $x$ is the distance between pivot pin 41 and the cam pin 45.

From the above it will be apparent that the developed normal force Q on the valve disc is directly proportional to the normal distance $x$ between pivot shaft 41 and the longitudinal axis of arms 44, 44, and is inversely proportional to the normal distance $y$ of the pivot shaft 41 from the perpendicular axis of valve disc 36.

By utilizing the above data, a typical flap valve according to the present invention was designed having a clear valve aperture A of 4 inches inside diameter and a handle length R of 4½ inches. It was found that in order to provide a sealing force Q of 200 pounds, the maximum force required on the handle to close the valve was only about 5 pounds.

While the valve described above and illustrated in the drawings is primarily suitable for use in high vacuum work, it is also applicable in other fields, as in applications where it is desirable not to use gaskets because of corrosion or chemical reaction. In these cases, because of the large internal force applied to the valve face when closed, the valve will not leak as the pressure against the face is increased, even if merely polished metal sealing surfaces are employed.

While a specific embodiment of an improved flap valve has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a flap valve, a casing element formed with an annular valve seat, a valve disc rotatably mounted in said casing element and arranged to sealingly engage said valve seat, a longitudinally slotted arm rigidly secured to said valve disc and extending at right angles thereto, a shaft journalled in said casing and extending parallel to the axis of rotation of the valve disc, a lever arm rigidly secured to said shaft, a pin on said lever arm slidably and cammingly engaging in the slot of the first-named arm, said pin being arranged to rotate the valve disc responsive to rotation of the shaft, said shaft extending sealingly and rotatably through a wall of the casing element, a handle secured to said shaft externally of the casing element, said pin being arranged to flex the first-named arm toward the valve disc when the valve disc is moved into sealing engagement with the valve seat, the flexure of the first-named arm providing sealing force on the valve disc, and means yieldably locking the shaft in valve-closing position with the first-named arm flexed.

2. In a flap valve, a casing element formed with an annular valve seat, a valve disc rotatably mounted in said casing element and arranged to sealingly engage said valve seat, a longitudinally slotted arm rigidly secured to said valve disc and extending at right angles thereto, a shaft journalled in said casing and extending parallel to the axis of rotation of the valve disc, a lever arm rigidly secured to said shaft, a pin on said lever arm slidably and cammingly engaging in the slot of the first-named arm, said pin being arranged to rotate the valve disc responsive to rotation of the shaft, said shaft extending sealingly and rotatably through a wall of the casing element, and a handle secured to said shaft externally of the casing element, said pin being located at a distance from said shaft greater than the normal distance of the shaft from the slot in the first-named arm, whereby the first-named arm is flexed when the valve disc is moved into sealing engagement with the valve seat, the flexure of the first-named arm providing sealing force on the valve disc.

3. The structure of claim 2, and means yieldably locking the shaft against rotation when the lever arm has been rotated into a position normal to the slot.

References Cited in the file of this patent

UNITED STATES PATENTS

| | | |
|---|---|---|
| 37,820 | Clelland | Mar. 3, 1864 |
| 383,981 | Perkins | June 5, 1888 |
| 452,453 | Mackey | May 19, 1891 |
| 571,065 | Clarke | Nov. 10, 1896 |
| 1,367,911 | Koplin | Feb. 8, 1921 |
| 1,492,883 | Kidder | May 6, 1924 |
| 1,636,461 | Colburn | July 19, 1927 |
| 1,756,078 | Khum | June 17, 1930 |
| 2,284,059 | Kehm | May 26, 1942 |

FOREIGN PATENTS

| | | |
|---|---|---|
| 904,318 | France | of 1945 |

OTHER REFERENCES

Mechanical Engineers Handbook, Marks, Third edition, 1930; McGraw-Hill of New York; pages 438 and 444.